D. LASH.
BEAN SNIPPING MACHINE.
APPLICATION FILED DEC. 3, 1919.
1,358,002.
Patented Nov. 9, 1920.
3 SHEETS—SHEET 1.
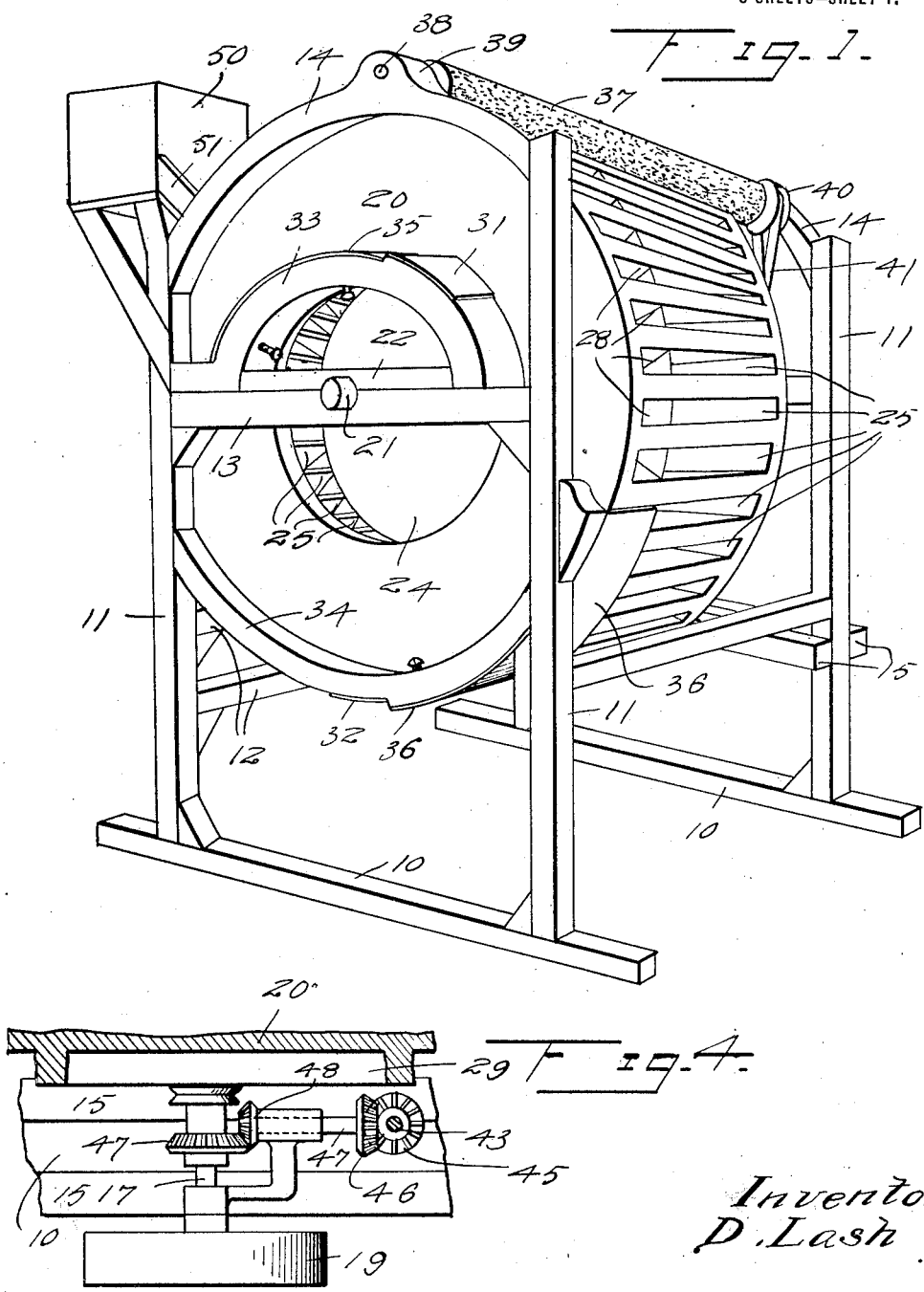

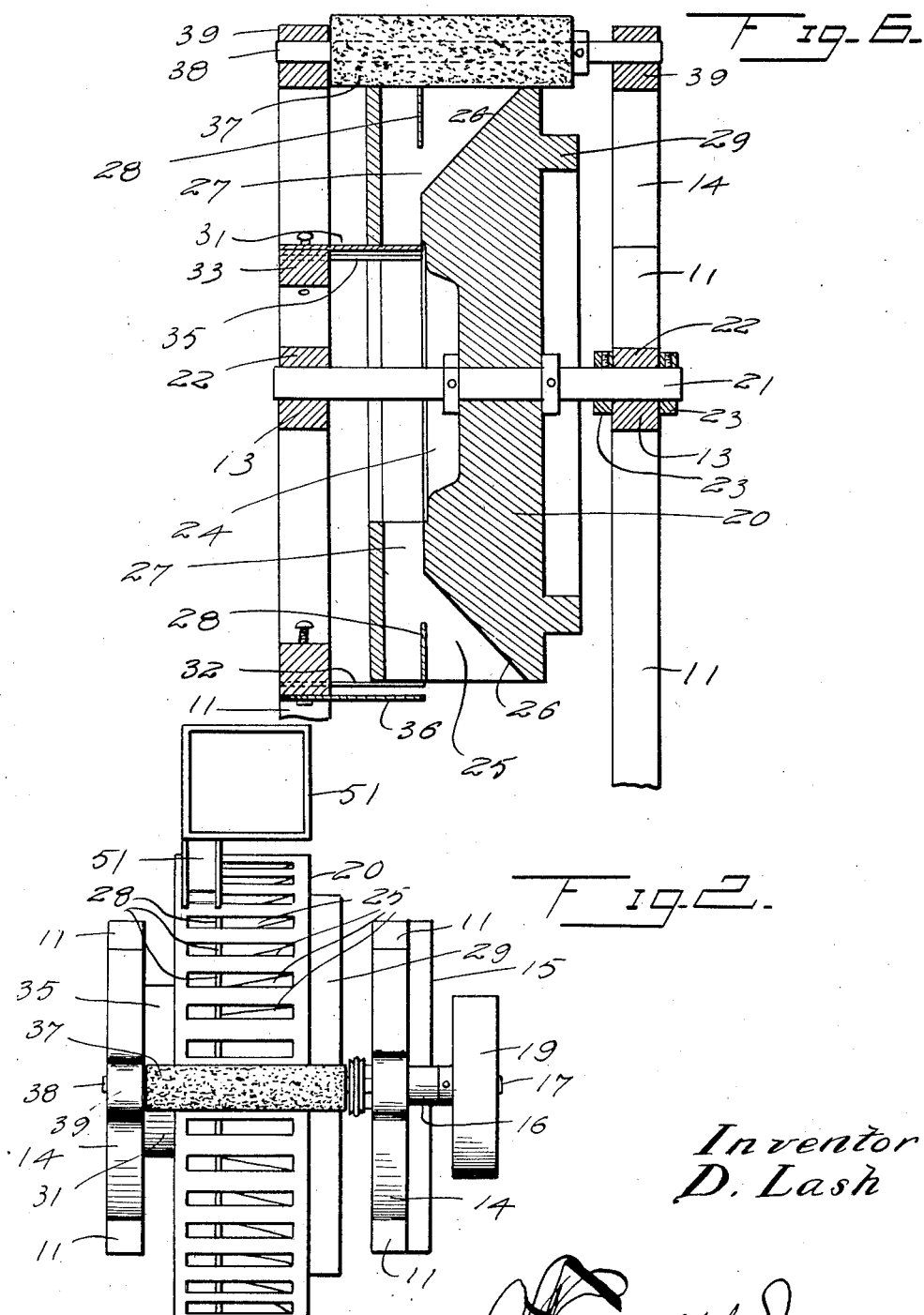

D. LASH.
BEAN SNIPPING MACHINE.
APPLICATION FILED DEC. 3, 1919.
1,358,002.
Patented Nov. 9, 1920.
3 SHEETS—SHEET 3.
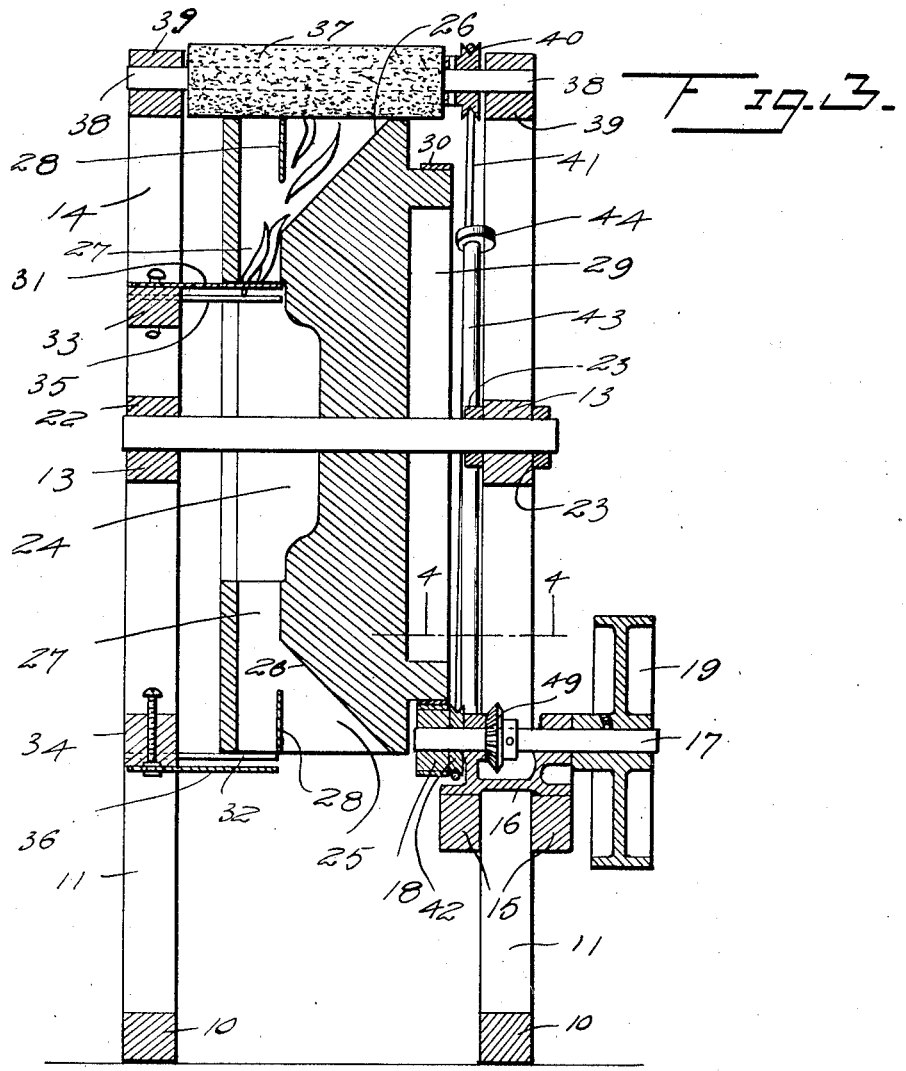
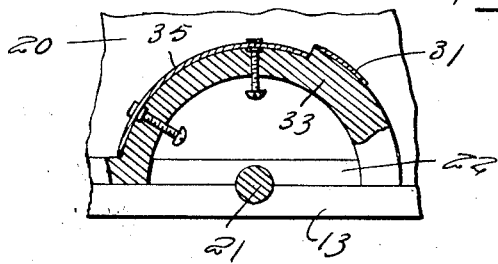
Inventor
D. Lash

UNITED STATES PATENT OFFICE.

DANA LASH, OF WINSLOWS MILLS, MAINE.

BEAN-SNIPPING MACHINE.

1,358,002.  Specification of Letters Patent.  Patented Nov. 9, 1920.

Application filed December 3, 1919. Serial No. 342,185.

*To all whom it may concern:*

Be it known that I, DANA LASH, a citizen of the United States, residing at Winslows Mills, in the county of Lincoln and State of Maine, have invented certain new and useful Improvements in Bean-Snipping Machines; and I do hereby declare the following to be a full, clear, and exact description of the invention, such as will enable others skilled in the art to which it appertains to make and use the same.

This invention relates to an improved bean snipping machine for snipping the ends of beans and one object of the invention is to so construct the machine that the beans may be fed into a rotating drum and first one end of a bean cut or snipped off and the bean then moved to bring its opposite end into position for cutting as the drum rotates, the bean dropping out of the drum after the second end has been cut off.

Another object of the invention is to so construct this machine that the drum may be provided with a centrally disposed pocket in which the beans will be loosely positioned thereby permitting one end portion of a bean to be snipped off at the inner periphery of the drum and the second end to be snipped off at the outer periphery of the drum.

Another object of the invention is to so construct this machine that the plate may support the beans at the proper position for cutting as the drum rotates to bring the beans into engagement with the cutting knives.

Another object of the invention is to so construct the drum that the beans may be easily fed into the drum and caused to move into a position to extend in radiating relation to the drum.

Another object of the invention is to provide a machine of the character described which will be easy to operate and in which the drum may be rotated by direct engagement of a driving belt or through engagement by a gear carried by driven shaft.

This invention is illustrated in the accompanying drawings wherein—

Figure 1 is perspective view of the improved bean snipping machine,

Fig. 2 is a top plan view,

Fig. 3 is a vertical sectional view through the machine,

Fig. 4 is a fragmentary sectional view taken on the line 4—4 of Fig. 3,

Fig. 5 is a view in elevation showing the means for adjustably mounting one of the cutting knives, and Fig. 6 is a view similar to Fig. 3 showing a slightly modified construction.

This machine is provided with a frame having foot bars 10 from which extend standards 11 connected by cross bars 12, 13 and 14. With the exception of the form shown in Fig. 6, this frame will be provided with supporting bars 15 upon which will be mounted the bearings 16 rotatably supporting the driving shaft 17 having at one end a friction gear 18 and at its outer end a pulley 19 about which a belt may pass.

A drum 20 is rigidly mounted upon a shaft 21 which rests in sockets formed in the cross bars 13 and is held in place by strips 22 and is held against longitudinal movement by the abutment collars 23 positioned upon opposite sides of one of the bars 13. If desired, similar collars may be provided for the opposite end portion of the shaft. This drum is provided with a central pocket 24 cut from one side face and is further provided with radially extending pockets 25 which taper inwardly from the outer periphery of the drum thus providing the sloping faces 26 and the reduced neck 27. Partitions 28 are provided in the pockets 25 and divide the outer or flared end portions of these pockets into side chambers and further serve to prevent the bean from moving out of a substantially vertical position when the end portions of the beans are being cut as will be hereinafter brought out. This drum is provided with an offset shoulder 29 which may be provided with a friction facing 30 for engagement by the friction gear 18 thus permitting the drum to be rotated by the shaft 17. In the form shown in Fig. 6, it is not necessary to provide this friction facing 30 as the driving belt will be placed about this extension and this shoulder will therefore constitute a pulley taking the place of the pulley 19, shaft 17 and gear 18.

In order to snip the ends of the bean and to gage the length of the end portions to be cut off there has been provided knives 31 and 32 which are secured to the curved supporting bars 33 and 34. Gage plates 35 and 36 are also carried by the supporting bars 33 and 34 to engage the end portions of the bean and support the bean in proper position for snipping the desired length of end from the bean. By proper adjustment, the gage plates and snipping knives may be held the desired distance apart thus permitting a short or long cut to be made. It will thus be seen that the bean will have one end cut at the inner periphery of the drum and the second end cut at the outer periphery of the drum, and further, that when the second end has been cut from the bean, the cut bean will drop out of the drum and into a suitable receptacle which may be placed in the frame beneath the drum. Of course, if desired, the machine may be mounted above a table upon which the cut beans will drop.

In order to prevent danger of the bean catching in the outer end portions of the pockets 25 and not passing down into the reduced neck 27 there has been provided a brush 37, the ends 38 of the shaft of which are journaled in bearings 39 carried by the cross bars 14. This shaft carries a pulley wheel 40 about which passes a driving belt 41 which also passes about a pulley 42 mounted upon the shaft 17. The bean might have a tendency to slip in the pocket 25 instead of sliding down the inclined faces 26 thereof and there has therefore been provided a vertically extending shaft 43 having a head 44 mounted eccentrically upon its upper end and adapted to strike the shoulder 29 as the shaft 43 rotates. This shaft 43 is provided at its lower end with beveled gear 45 which meshes with the beveled gear 46 of a short shaft 47 the opposite end of which carries a beveled gear 48 which meshes with a beveled gear 49 carried by the shaft 17. The vibration caused by the eccentric head 44 striking the shoulder 29 will cause the bean to move through the pocket into the reduced end portion 27 and into engagement with the gage plate 35.

When this machine is in operation, the beans to be cut are placed in the hopper 50 and will be fed down the chute 51 thereof so that they will drop into the pockets 25 of the drum. The beans upon entering the pockets will engage the inclined faces 26 and will slide down these faces and into the necks 27 where they will extend through the open ends of the neck and engage the upper gage plate 35. As the drum rotates the beans will be brought into engagement with the cutting knife 31 and one end portion of each bean will be cut off. After the first end has been cut off the continued rotation of the drum will cause the beans to slide toward the outer periphery of the drum and will be prevented from moving into the tapered side portions of the pockets by the plate 28. Upon reaching the outer periphery of the drum the beans will engage the gage plates 36 and will be held in the proper position for cutting the desired length of ends from each bean when the beans are brought into engagement with the cutting knife 32. After being cut by the knife 32 and passing beyond this knife they will drop out of the pocket and will fall down into a receptacle or on the table beneath the machine. The brush 37 prevents any danger of the beans being caught and remaining at the outer ends of the pocket and the eccentric shaker causes them to slide down through the pocket and into the reduced end of the pocket. A machine has therefore been provided by means of which the end portions of the beans may be easily and quickly snipped off and the snipped bean permitted to pass out of the machine into a suitable receptacle. There has further been provided a machine in which the length of the end portions to be cut off may be controlled and thus waste avoided.

What is claimed is:

1. A bean snipping machine including a frame, a drum mounted for rotation therein and having a centrally located pocket leading from one side thereof and having a radially disposed pocket leading from the central pocket to the periphery of the drum, said radially disposed pocket being provided with a side wall which is inclined at an acute angle with relation to the axis of the drum, a partition located in the radially disposed pocket and positioned opposite the inclined wall thereof and spaced therefrom, a gage plate and a cutting knife carried by said frame and extending into the central pocket of the drum and positioned in operative relation to the inner end of the radially disposed pockets, and a cutting knife and gage plate carried by the frame and extending beneath the drum and positioned in operative relation to the outer end of the radially disposed pocket.

2. A bean snipping machine comprising a frame, a bean holding drum rotatably mounted in the frame and having a shoulder extension forming a gear, bean cutting means positioned in operative relation to the drum, a driving shaft rotatably mounted, a gear carried by the driving shaft having engagement with the gear of said drum, a rotatably mounted shaft extending vertically of the frame, a head mounted eccentrically upon the vertical shaft for striking said drum as the vertical shaft rotates, means for transmitting rotary movement from the driving shaft to the vertical shaft, a brush rotatably connected with said frame and extending across the drum in operative relation thereto, and means for transmitting rotary movement from the driving shaft to the rotary brush.

3. A bean snipping machine comprising a frame, a rotatably mounted bean carrying drum carried by said frame, cutting means carried by the frame in operative relation to the drum, a driving shaft carried by said frame, means for transmitting rotary movement from the driving shaft to the drum, an agitator for said drum carried by said frame in operative relation thereto, and means for transmitting movement from the driving shaft to the agitator.

In testimony whereof I affix my signature in presence of two witnesses.

DANA LASH.

Witnesses:
OTTO V. HASSNER,
HENRY P. MASON.